A. C. LINDGREN.
WHEELED PLOW.
APPLICATION FILED JUNE 30, 1911.
1,159,689.
Patented Nov. 9, 1915.
2 SHEETS—SHEET 2.
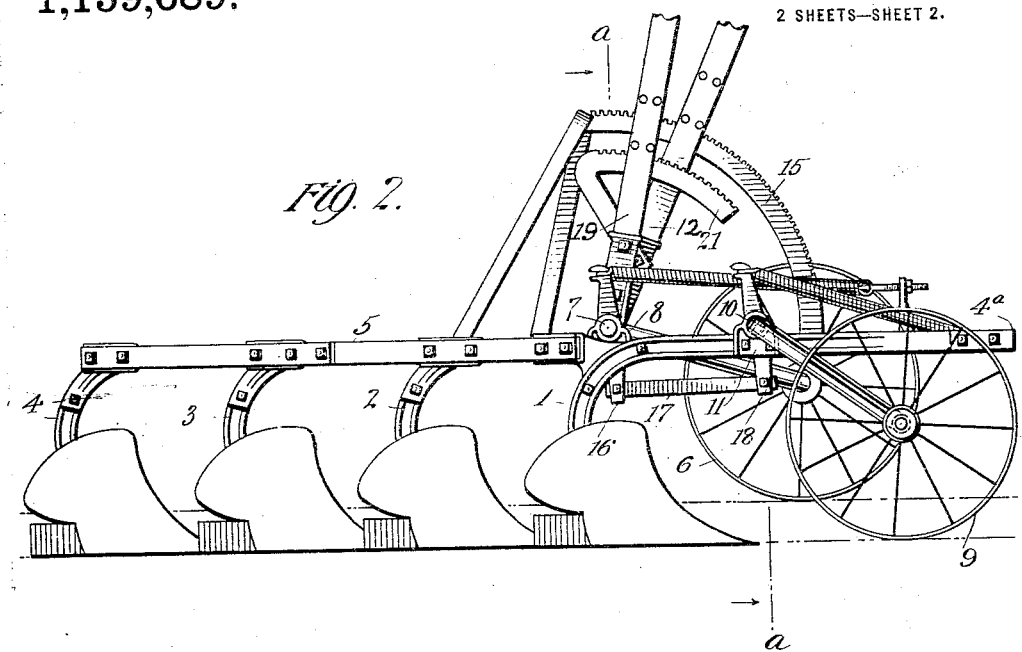
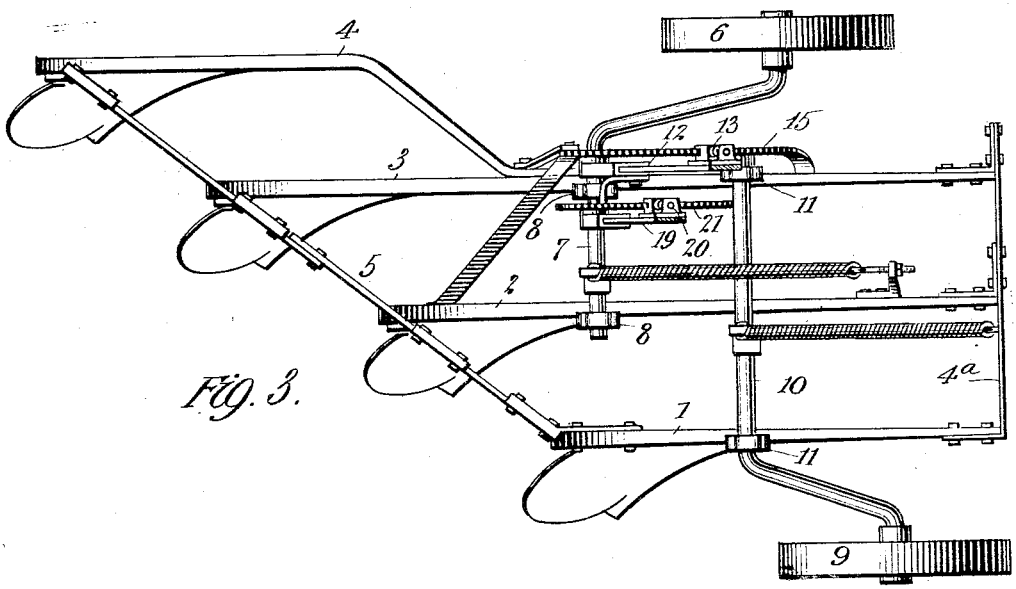
Witnesses:
Inventor
A. C. Lindgren
By his Attorney

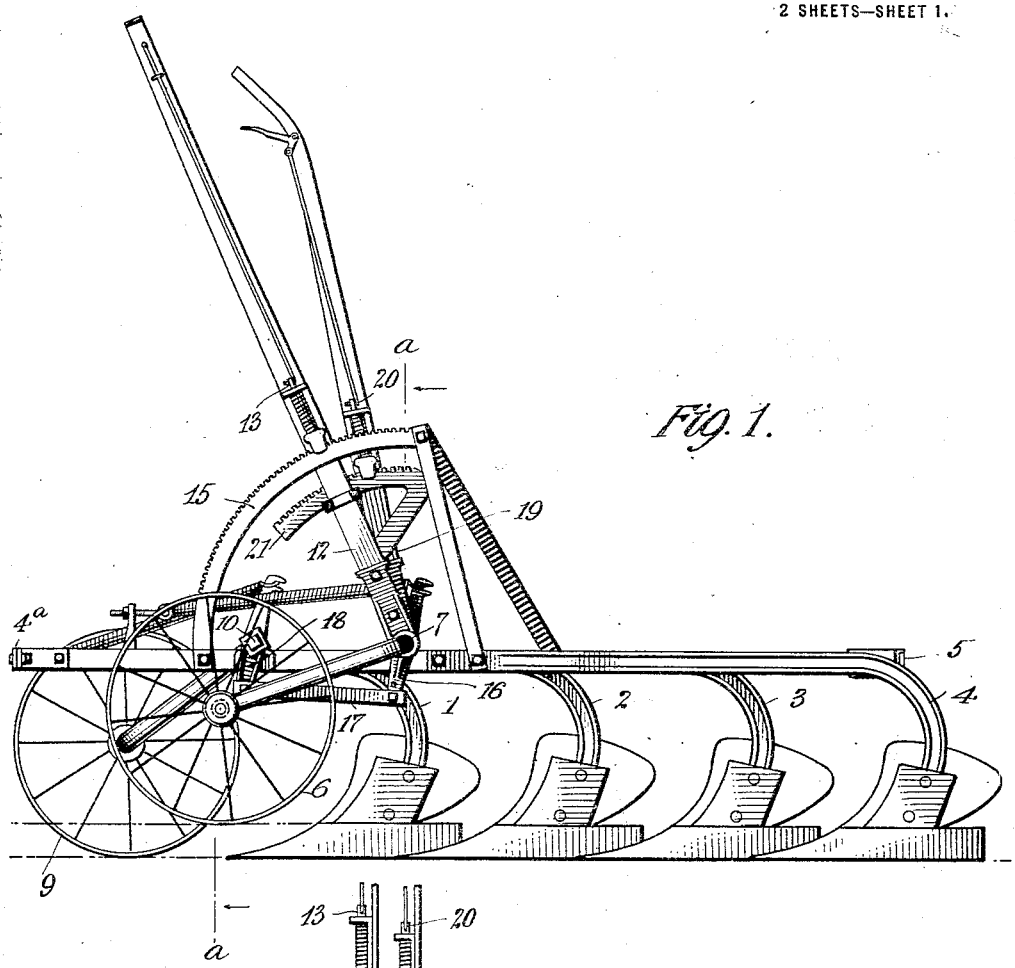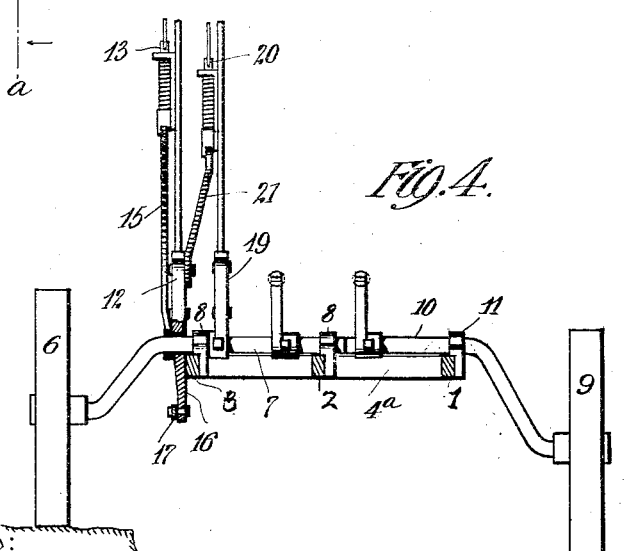

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

WHEELED PLOW.

1,159,689.   Specification of Letters Patent.   Patented Nov. 9, 1915.

Application filed June 30, 1911. Serial No. 636,142.

*To all whom it may concern:*

Be it known that I, ALEXUS C. LINDGREN, a citizen of the United States, residing at Moline, in the county of Rock Island and State of Illinois, have invented certain new and useful Improvements in Wheeled Plows, of which the following is a specification, reference being had therein to the accompanying drawing.

This invention relates to wheeled plows and has reference more particularly to the means for adjusting the supporting wheels up and down in order to raise and lower the plow.

In accordance with my invention the frame of the plow is supported on opposite sides by ground wheels, one a land wheel and the other a furrow wheel, which wheels are movable up and down with reference to the frame. Adjusting levers are operatively connected with the respective wheels in such manner that they may be adjusted independently of each other, and means are provided whereby the levers are adapted to coöperate with each other so that by the operation of one of the levers both wheels may be adjusted in unison.

In the accompanying drawings: Figure 1 is a side elevation of a plow having my invention embodied therein, as viewed from the land side. Fig. 2 is a similar view from the furrow side. Fig. 3 is a top plan view of the plow. Fig. 4 is a transverse sectional elevation on the line *a—a* of Figs. 1 and 2.

Referring to the drawings: The plow shown in the accompanying drawings to illustrate by way of example the application of my improved adjusting mechanism, comprises a number of fore and aft beams 1, 2, 3, etc., equipped with suitable mold board plows and connected at their front ends by a transverse frame bar 4ª and at their rear ends by a transverse frame bar 5, whereby a rigid frame structure is formed. At one side the frame is supported by a land wheel 6 mounted on the crank end of a horizontal axle 7 journaled to rock in bearings 8—8 fixed to the beams. At its opposite side the frame is supported by a furrow wheel 9 mounted on the crank end of a horizontal axle 10 journaled to rock in bearings 11—11 applied to the beams in advance of the axle 7. Loosely mounted on the axle 7 at the side of the frame, is an adjusting lever 12 provided with a locking dog 13 adapted to engage the teeth of a segment frame 15 fixed to the side of the frame, by which means the lever may be held in its different positions of adjustment on the axle 7 as an axis. The lever is extended downwardly below the axle in the form of an arm 16 which is connected by a forwardly extending link 17 to an arm 18 fixed to the end of the axle 10, by which means the axle 10 may be rocked to adjust the furrow wheel. Fixedly mounted on the axle 7 adjacent the lever 12 is a second adjusting lever 19 provided with a locking dog 20 engaging the teeth of a segment frame 21, carried by the lever 12, the adjustment of this lever 19 serving to rock the axle 7 and to correspondingly adjust the land wheel carried thereby.

If it is desired to adjust both wheels in unison to raise and lower the plow, lever 12 is unlatched from segment frame 14 and operated, by which action the lever 19 will be rocked, the land wheel axle will be rocked with the lever 19, and the furrow wheel axle will be rocked by reason of the connection of the lever 12 with the furrow wheel axle through the medium of the arms 16 and 18 and their connecting link 17.

If it is desired to adjust the land wheel alone and independently of the furrow wheel, the lever 19 is unlatched from the segment frame 21 and being moved, will rock axle 7, thereby adjusting the land wheel but not disturbing the lever 12, because the land wheel axle rotates loosely in the lever 12 and the latter remains locked to the fixed segment frame 14.

If again it is desired to adjust the furrow wheel only and independently of the land wheel, then lever 19 is unlatched from the segment frame 21 of lever 12 and is fixedly held by the hand. Lever 12 is then unlatched from the fixed segment frame 14 and operated, with the result that the furrow wheel axle will be rocked by the link connection between the arms on the axle and lever 12, and when the proper adjustment has been secured, lever 12 is again locked to the fixed segment frame 14, whereupon lever 19 is again locked to the segment 21.

It is seen, therefore, that by my improved lever mechanism either wheel may be adjusted independently of the other, or both wheels may be adjusted in unison as desired.

I have illustrated in the accompanying drawings and described above the preferred means for carrying my invention into effect. It is manifest, however, that the details shown may be variously changed and modified within the knowledge of the skilled mechanic without departing from the spirit of my invention; and it is to be understood that the invention is not limited to any particular form or construction of the parts except in so far as such limitations are specified in the claim.

Having thus described my invention, what I claim is:—

In a wheeled plow, the combination of a frame; a plow-beam attached thereto; a land-wheel axle journaled in the frame and having a forwardly extending crank-arm carrying a land-wheel; a furrow-wheel axle also journaled in the frame and in spaced apart relation to the land-wheel axle and also having a forwardly extending crank-arm carrying a furrow-wheel; an arm depending from the furrow-wheel axle; a primary lever fulcruming on the land-wheel axle and in which said axle is free to rotate; a segment member mounted on and movable with and inclining away from the lever; a second arm depending from the lever and independent of said segment member and substantially parallel with the first-mentioned arm; a link lying in a horizontal plane and connecting said arms and extending approximately at right angles to and constantly in a plane below both axles and whereby when the lever is actuated the furrow-wheel axle only is rocked; a segment-member mounted on the frame for locking the lever in different positions of adjustment on the frame; a secondary lever fast on the land-wheel axle for effecting movement thereof independent of the furrow-wheel axle; both of the levers being disposed in a plane corresponding to the point of attachment to the land wheel axle of the lever fast thereon, and means on the secondary lever and engageable with the segment-member on the primary lever to lock the levers together, whereby movement of the primary lever to rock the furrow-wheel axle will actuate the secondary lever to rock the land-wheel axle simultaneously and thereby move the two wheel-carrying crank-arms in the same direction.

In testimony whereof I affix my signature in presence of two witnesses.

ALEXUS C. LINDGREN.

Witnesses:
L. C. BLANDING,
JAMES J. LAMB.